US012630782B2

(12) United States Patent
Beddie

(10) Patent No.: US 12,630,782 B2
(45) Date of Patent: May 19, 2026

(54) APPLICATIONS OF HOP ACIDS

(71) Applicant: BARTH-HAAS UK LIMITED, Kent (GB)

(72) Inventor: David Beddie, Kent (GB)

(73) Assignee: BARTH-HAAS UK LIMITED, Kent (GB)

( * ) Notice: Subject to any disclaimer, the term of this patent is extended or adjusted under 35 U.S.C. 154(b) by 871 days.

(21) Appl. No.: 17/294,675

(22) PCT Filed: Nov. 19, 2019

(86) PCT No.: PCT/EP2019/081843
§ 371 (c)(1),
(2) Date: May 17, 2021

(87) PCT Pub. No.: WO2020/104478
PCT Pub. Date: May 28, 2020

(65) Prior Publication Data
US 2022/0017838 A1     Jan. 20, 2022

(30) Foreign Application Priority Data

Nov. 19, 2018     (GB) ..................................... 1818793

(51) Int. Cl.
*C11B 9/00*          (2006.01)
*B01F 23/41*         (2022.01)
(Continued)

(52) U.S. Cl.
CPC ............ *C11B 9/0034* (2013.01); *B01F 23/41* (2022.01); *B01F 23/43* (2022.01); *C12C 3/04* (2013.01);
(Continued)

(58) Field of Classification Search
CPC .. A23L 2/56; A23L 29/10; B01F 23/41; B01F 23/43; C12C 7/287; C12C 5/026; C12C 3/08; C12C 3/04; C11B 9/0034
See application file for complete search history.

(56) References Cited

U.S. PATENT DOCUMENTS 3,486,906 A     12/1969  Todd et al.
3,979,527 A      9/1976  Laws et al.
(Continued)

FOREIGN PATENT DOCUMENTS

CA          796724 A     10/1968
EP        0020086 A1     12/1980
(Continued)

OTHER PUBLICATIONS

Barth-Haas Group, "Aromahop® OE", Feb. 2016, 3 pages.
(Continued)

*Primary Examiner* — Vera Stulii
(74) *Attorney, Agent, or Firm* — SQUIRE PATTON BOGGS (US) LLP

(57)     ABSTRACT

The present invention relates to novel applications of hop acids and formulations using hop acids. More specifically, the present invention relates to formulations comprising hop acids to stabilise or emulsify hop oils or other essential oils in aqueous media. We describe an aqueous emulsifiable composition comprising 0.01-5.00 wt % of at least one essential oil and 0.005-10.0 wt % of at least one hop acid, the balance being water. We also describe a method of stabilising or emulsifying an essential oil or mixture of essential oils. The method comprises mixing the essential oil or mixture of essential oils with at least one hop acid to form an essential oil and hop acid mixture and mixing the essential oil and hop acid mixture with water. We further describe the use, as an emulsifier, of a composition com-
(Continued)

Stability of aqueous formulations containing 0.1 % whole oil formulations and 0.2% KBR after 35, 105 and 360 days.
Scale: 5 – No separation, 4 – very slight separation, 3 – slight separation, 2 – some separation, 1 – significant separation.

prising at least one hop acid and beverages obtainable with the composition.

22 Claims, 4 Drawing Sheets

(51) Int. Cl.

| | |
|---|---|
| *B01F 23/43* | (2022.01) |
| *C12C 3/04* | (2006.01) |
| *C12C 5/02* | (2006.01) |
| *B01F 23/40* | (2022.01) |

(52) U.S. Cl.
  CPC .......... *C12C 5/026* (2013.01); *B01F 23/4145* (2022.01); *B01F 23/48* (2022.01)

(56) References Cited

U.S. PATENT DOCUMENTS

| | | |
|---|---|---|
| 2003/0185934 A1 | 10/2003 | Ting et al. |
| 2014/0255587 A1 | 9/2014 | Leker et al. |
| 2018/0291318 A1 | 10/2018 | Byelashov et al. |

FOREIGN PATENT DOCUMENTS

| | | |
|---|---|---|
| EP | 0611168 A2 | 8/1994 |
| WO | 2002/02497 A1 | 1/2002 |
| WO | 2018/073384 A1 | 4/2018 |

OTHER PUBLICATIONS

Barth-Haas Group, "$CO_2$ Hop Extract (Oil Enriched)", Feb. 2016, 3 pages.
Barth-Haas Group, "$CO_2$ Hop Extract", Feb. 2016, 3 pages.
Narziss, et al., "Studie über die automatische Hopfendosierung mit Hilfe einer wässrigen Lösung von Hopfenextrakt", Brauwelt, vol. 113, No. 66, Jan. 1, 1973, pp. 1339-1344, XP055665842.
International Search Report and Written Opinion of PCT/EP2019/081843 dated May 28, 2020, 10 pages.
Great Britain Search Report for patent application No. GB 1818793.0 dated May 21, 2019.
Brazilian Patent Application No. BR112021009684-1 Technical Examination Report.

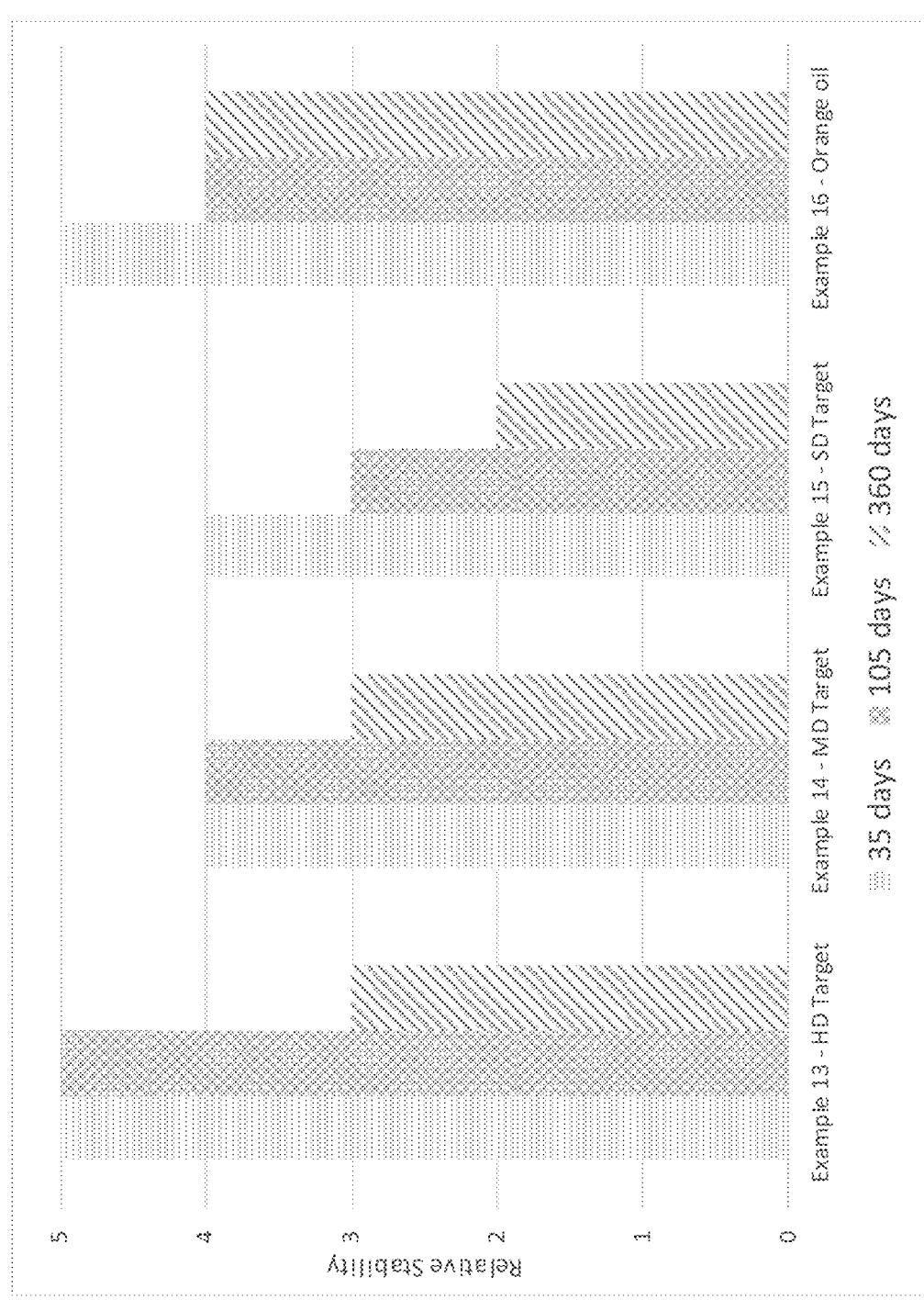
Figure 1 – Stability of aqueous formulations containing 0.1 % whole oil formulations and 0.2% KBR after 35, 105 and 360 days.
Scale: 5 – No separation, 4 – very slight separation, 3 – slight separation, 2 – some separation, 1 – significant separation.

Figure 2 – Stability of aqueous formulations containing 0.1% fractionated oil and KBA (0.1% or 0.05%), after 48, 99 and 239 days.
*Scale: 5 – No separation, 4 – very slight separation, 3 – slight separation, 2 – some separation, 1 – significant separation.*

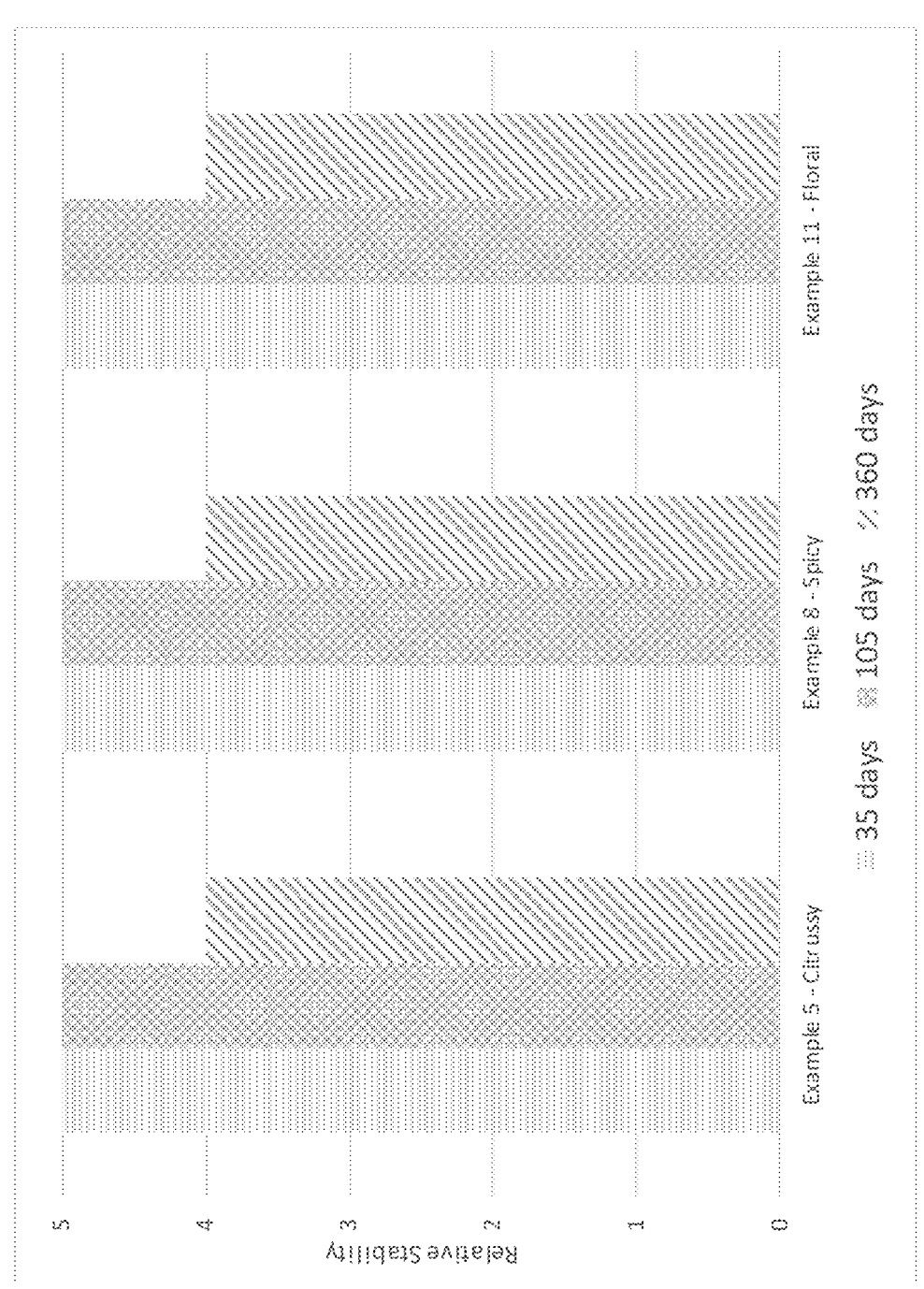
Figure 3 – Stability of aqueous formulations containing 0.1% fractionated oil and 0.2% KBR, after 35, 105 and 360 days.
Scale: 5 – No separation, 4 – very slight separation, 3 – slight separation, 2 – some separation, 1 – significant separation.

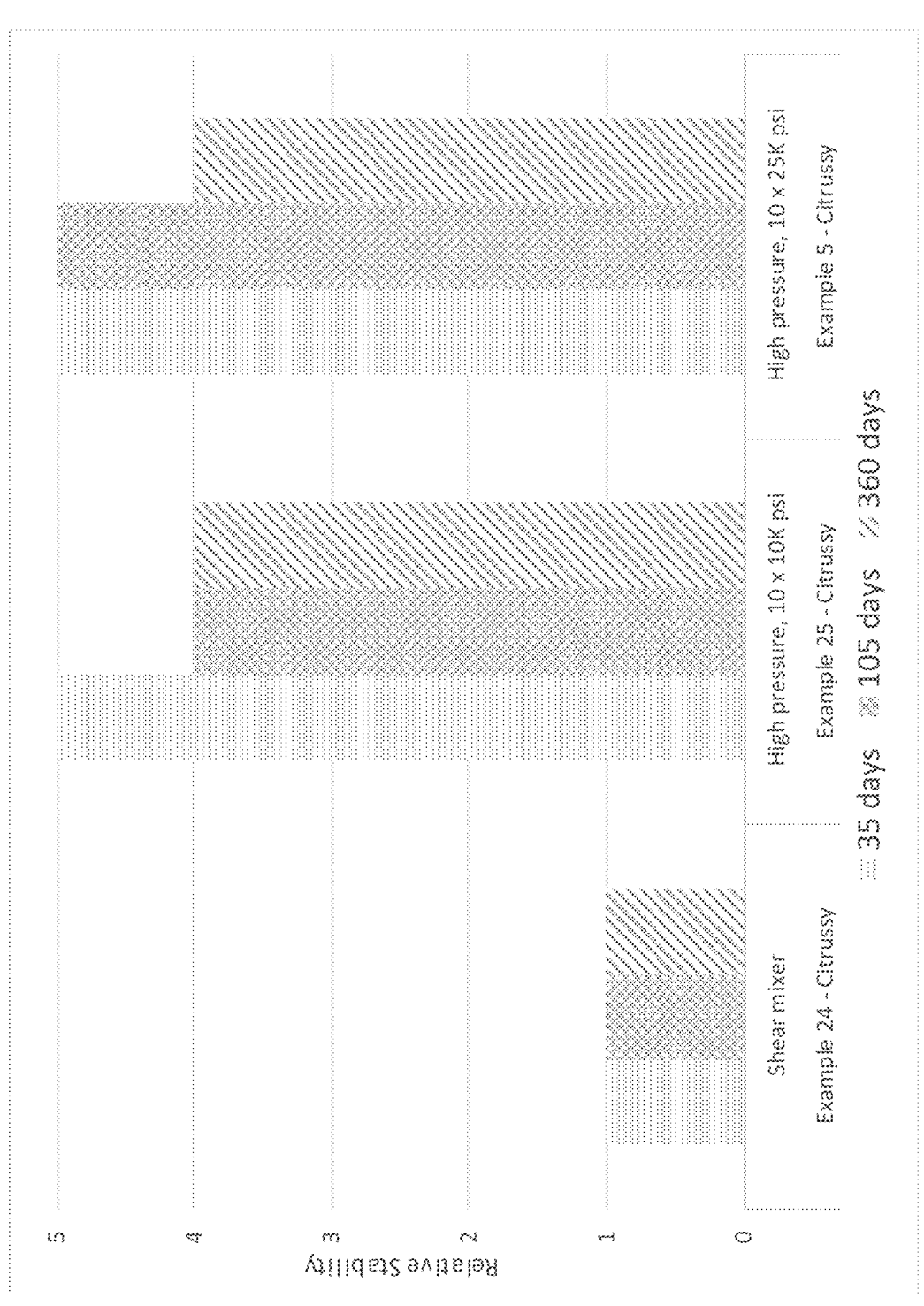
Figure 4 – Stability of aqueous formulations under shear and high-pressure mixing, after 35, 105 and 360 days.
*Scale: 5 – No separation, 4 – very slight separation, 3 – slight separation, 2 – some separation, 1 – significant separation.*

APPLICATIONS OF HOP ACIDS

CROSS-REFERENCE TO RELATED APPLICATIONS

This application is a national-stage filing under 37 USC 371(c) of International Application No. PCT/EP2019/081843, filed Nov. 19, 2019, which claims priority to, and the benefit of, European Patent Application GB1818793.0, filed Nov. 19, 2018, the entire contents of each of which are herein incorporated by reference in their entirety for all purposes.

The present invention relates to novel applications of hop acids and formulations using hop acids. More specifically, the present invention relates to formulations comprising hop acids to stabilise or emulsify hop oils or other essential oils in aqueous media.

Hop acids are a group of organic compounds with acidic character obtained from the hop plant *Humulus lupulus*. Hop acids include alpha acids (humulone and its homologues), beta acids (lupulone and its homologues) and derivatives formed by isomerisation, oxidation and reduction. Many of these compounds give bitterness to beer.

Essential oils are natural aroma oils extracted from plants and, typically, distilled to form a concentrated oil. The oils may contain a single component but are often a complex mixture of components. Essential oils may be used in a number of industries, including perfumery and in flavouring food and beverages. Hop oils are used to flavour beer, either by adding hop cones or extracts to the beer or by adding isolated hop essential oils or fractions thereof.

Isolated hop oils are commonly used by brewers in preference to dry hopping due to greater consistency of flavour and bitterness from one batch to another. Additionally, dry hopping with hop cones causes yield losses due to uptake of beer on the cellulosic material, which does not occur when adding isolated hop oils. Hop oils are conventionally formulated as either aqueous emulsions using synthetic emulsifiers such as polysorbates, or dissolved in solvents such as propylene glycol. These ingredients however, are synthetic and not found naturally in beer. Additionally propylene glycol is subject to regulatory limits as a carrier for flavourings. An alternative solvent is ethanol, but this is undesirable due to its flammable nature making transport expensive and, because it is not an inert solvent, side reactions can potentially occur with flavour components in the oil. Additionally, brewers do not like to add exogenous ethanol to beer, since the preference is for all alcohol in the brewed product to have been produced solely during the brewing process.

Accordingly, there is a need for an alternative hop oil formulation.

Surprisingly, we have found that hop acids can be used as emulsifiers which hitherto has not been reported. In this invention, essential oils such as hop essential oils can be formulated as stable aqueous emulsions by combination with hop acids. This new formulation overcomes all the problems associated with existing synthetic emulsifiers and solvents.

We have also determined that our developments are applicable to both: i) whole essential oils, being mixtures of components obtained by extraction from plant material; and ii) fractionated essential oils, being single components or selections of components that have been isolated or purified from a whole essential oil. The term "essential oil" as used herein will be construed accordingly.

In its broadest sense, the present invention provides an aqueous emulsifiable composition or emulsion comprising at least one hop acid and at least one essential oil in water.

In one aspect, the present invention provides an aqueous emulsifiable composition comprising at least one essential oil, at least one hop acid and water; wherein the total essential oil content of the composition is from 0.01-5.0 wt % and the total hop acid content of the composition is from 0.005-10.0 wt %, the balance being water.

In a further aspect, the present invention provides a method of stabilising or emulsifying an essential oil or mixture of essential oils, the method comprising the step of mixing the essential oil or mixture of essential oils with at least one hop acid.

Preferably, the method further comprises the step of shear mixing the mixture or high-pressure homogenisation of the mixture, preferably, high-pressure homogenisation.

In a yet further aspect, the present invention also provides the use, as an emulsifier, of a composition comprising at least one hop acid.

Preferably, the at least one hop acid is a beta acid, alpha acid, iso-alpha acid, rho-iso-alpha acid, tetrahydro-iso-alpha acid, hexa-hydro-iso-alpha acid, hexahydro-beta acid, hulupone or humulinone or a mixture or mixtures thereof.

Preferably, the at least one hop acid is at least one hop beta acid.

Preferably, the at least one hop acid is at least one hop acid salt, more preferably a monovalent salt, even more preferably a potassium salt or a sodium salt, most preferably a potassium salt.

Preferably, the at least one hop acid or hop acid salt is at least one isolated or purified hop acid or hop acid salt.

Preferably, the at least one essential oil is at least one hop essential oil, or at least one fruit essential oil, or at least one flower essential oil, or at least one seed essential oil, or mixture or mixtures thereof.

Preferably, the composition has a hop acid content and total essential oil content in a ratio of about 1:5 to about 5:1; more preferably in a ratio of about 1:2 to about 2:1.

Preferably, the composition is formed by mixing the at least one hop acid and the at least one essential oil and combining the mixture with water.

Preferably, the composition has an essential oil content of up to about 2 wt %, more preferably up to about 1 wt %. Most preferably, the composition has an essential oil content of from 0.1 wt % to 1 wt %.

Preferably, the composition has a hop acid content of 0.01 wt/% or more, more preferably, 0.05 wt %.

Preferably, the composition has a hop acid content of up to about 5 wt %, more preferably up to about 2 wt %. Most preferably, the composition has a hop acid content of 0.05 wt % to 2 wt %.

The present invention also provides a method of flavouring a beverage, the method comprising mixing a composition as defined above with a beverage.

Advantageously, the beverage has an alcohol content of 10% ABV or lower, 5% ABV or lower, 1.2% ABV or lower; 1.0% ABV or lower; 0.5% ABV or lower; 0.1% ABV or lower; or 0.05% ABV or lower.

Advantageously, the at least one essential oil is at least one hop essential oil and the beverage is a beer. Conveniently, the composition is mixed during or at the end of the beer brewing process.

The present invention further provides a beverage obtained by the method of flavouring a beverage.

EXAMPLES

The above and other aspects of the present invention will now be described in further detail, with reference, by way of example only, to the following examples.

Preparations were prepared by mixing essential oils with hop acids and water at room temperature, suitably by premixing oil and hop acid before mixing with water. The mixture was manually stirred, shear mixed or high pressure homogenised. Advantageous compositions were prepared using a high-pressure homogeniser at 5,000-50,000 psi, which gave an oil droplet particle size of <10 μm.

Hop oil extracts can be prepared by standard techniques (such as by using supercritical carbon dioxide). Whole hop oils are prepared by distillation techniques such as molecular distillation, steam distillation or hydro-distillation. All these techniques are well-known to the skilled person (*Handbook of Brewing, Edition* 3, CRC Press, 2017, sec 7.3.7) and many hop oils and hop oil extracts are available commercially.

Hop oil fractions, such as spicy, citrussy and floral, are commonly known fractions, and are typically made by supercritical fluid extraction, as disclosed for example by G. Aerts (*The J. of Supercritical Fluids*, 71, 147-161, 2012) or by fractionation techniques as described by Murray et al (*Proceedings of the European Brewery Convention Madrid*. IRL Press, Oxford, 321-328, 1987), to which further reference should be made.

Hop acids can be isolated and prepared by standard techniques. All these techniques are well-known to the skilled person (Developments in Food Science 27, *Chemistry and Analysis of Hop and Beer Bitter Acids, Elsevier*, 1991) and many are available commercially.

Accordingly, except where the context necessitates, details of the extraction or isolation procedures are omitted in the following examples.

EXPERIMENTAL

Example 1 (Reference)

Formation of Potassium Salt of Hop Beta Resin (KBR)

A dilute aqueous solution of a potassium salt of hop beta resin (Barth-Haas-Group, BetaStab® 10 A) (400 g) was evaporated under reduced pressure at 70° C., to give a brown semi-solid (96 g, 41% hop beta acids).

Example 2 (Reference)

Formation of Potassium Salt of Hop Beta Acids (KBA)

A dilute aqueous solution of a potassium salt of hop beta resin (Barth-Haas Group, BetaStab® 10 A) was acidified with 40% sulphuric acid (200 g) at 70° C. The resultant resin layer was purified by recrystallization to give hop beta acid crystals (138 g, 85.87%). Hop beta acid crystals (10 g) were warmed to 60° C. and 40% w/w potassium hydroxide (3.6 g) added dropwise until pH 10.1. A brown semi-solid resin was formed (containing 62.09% hop beta acids).

Example 3

Formation of Oil Formulations

The potassium salt of hop beta acids (KBA) of Example 2 (0.32 g, 62.09% hop beta acids) and citrussy hop oil (0.2 g) obtained from purification of hop essential oil (Barth-Haas-Group) were manually mixed. The mixture (0.52 g, 38% hop beta acids) was added to vigorously stirred deionized water (200 g) at room temperature. The resultant emulsion containing 0.1% w/w citrussy hop oil and 0.1% w/w hop beta acids was passed through a high-pressure homogeniser (Avestin Emulsiflex-C3) at 25,000 psi.

Example 4

Formation of Oil Formulations

The potassium salt of hop beta acids (KBA) of Example 2 (0.16 g, 62.09% hop beta acids) and citrussy hop oil (0.2 g) were manually mixed. The mixture (0.36 g, 27.6% hop beta acids) was added to vigorously stirred deionized water (200 g) at room temperature. The resultant emulsion containing 0.1% w/w citrussy hop oil and 0.05% w/w hop beta acids was passed through a high-pressure homogeniser (Avestin Emulsiflex-C3) at 25,000 psi.

Example 5

Formation of Oil Formulations

The crude potassium salt of hop beta resin (KBR) of Example 1 (2.5 g, 41% hop beta acids) and citrussy hop oil (0.5 g) were manually stirred. The resultant mixture (3 g) was added to stirred deionized water (500 g) at room temperature. The resultant emulsion containing 0.1% w/w citrussy hop oil and 0.2% w/w hop beta acids was passed through a high-pressure homogeniser (Avestin Emulsiflex-C3) at 25,000 psi.

Examples 6-11

Examples 3-5 were repeated using spicy hop oils and floral hop oils in place of the citrussy hop oil, giving the following combinations:

| Hop beta acid/Hop beta resin potassium salt | Hop oil (0.1% w/w) | | |
|---|---|---|---|
| | Citrussy | Spicy | Floral |
| 0.1% KBA w/w | Example 3 | Example 6 | Example 9 |
| 0.05% KBA w/w | Example 4 | Example 7 | Example 10 |
| 0.2% KBR w/w | Example 5 | Example 8 | Example 11 |

Example 12

Dosing Aqueous Hop Oil Solutions in Beer at 400 Ppb Oil

Bottles of a commercial lager beer (300 ml) were cooled to 5° C. The crown corks were removed and 0.12 ml of the 0.1% oil formulations of Example 3, 6 and 9) were injected into the beer in respective bottles. Each bottle was re-corked and vigorously shaken for 10 minutes. The bottles were stored at 5° C. overnight prior to analysis by a taste panel and with a haze meter.

Dosing at 400 ppb oil was chosen as a standard dosing rate for the purposes of our tests and comparisons. The skilled person will appreciate that a suitable dose for a particular beer will depend on the base beer, whether the oil is a whole extract or an oil fraction and the final flavour the brewer is seeking to achieve. Doses may typically be in the region of 100-200 ppb oil.

Examples 13-15

Whole Hop Oils

Example 5 was repeated, replacing the citrussy hop oil fraction with distilled whole hop oils from the variety Target:
    hydro-distilled (HD) (Example 13),
    molecular distilled (MD) (Example 14); and
    steam distilled (SD) (Example 15).

Example 16

Non-Hop Oils

Example 5 was repeated using 100% orange (*Citrus sinensis*) essential oil (Miaroma) to give a final formulation of 0.1% w/w orange oil and 0.2% w/w hop beta acids.

Example 17

Other Hop Acids

The potassium salt of hop alpha acids (0.09 g) and HD Target hop oil (0.09 g) were mixed together and added to vigorously stirred water (90 g) at room temperature. Stirring was continued for 2 hours.

Example 18-19

Other Hop Acids

Example 17 was repeated with the potassium salt of hop alpha acids replaced with the potassium salt of iso-alpha acids (Example 18) and the potassium salt of hop beta acids (Example 19).

Example 20

Varying Concentrations of Fractionated Oil in Final Product

The potassium salt of hop beta resin (KBR) from Example 1 (3.6 g, 41% hop beta acids) and a Cascade oil fraction (1.5 g) (Barth Haas Group) were mixed with vigorous stirring (5.1 g). A portion of this mixture (0.034 g) was added to water (9.66 g) and vigorously stirred for 30 minutes resulting in a formulation containing 0.1% w/w oil and 0.1% w/w hop beta acids. The final stage was repeated with different ratios of the mixture to water to give 10%, 1%, 0.5%, 0.05% and 0.01% w/w oil formulations.

Example 21

Varying Concentrations of Whole Oils in Final Product

The potassium salt of hop beta resin (KBR) from Example 1 (2.4 g, 41% hop beta acids) and hydro-distilled Target whole hop oil (Barth-Haas Group) (1 g) were mixed with vigorous stirring (3.4 g). A portion of this mixture (0.034 g) was added to water (9.66 g) and vigorously stirred for 30 minutes resulting in a formulation containing 0.1% w/w oil and 0.1% w/w hop beta acids. The final stage was repeated with different ratios of the mixture to water to give 5%, 2%, 1%, 0.5%, 0.05% and 0.01% w/w oil formulations.

The experiment was repeated with the Target hop oil replaced with lemon (*Citrus limon*) essential oil (NHR Organic Oils) (Example 22) or peppermint (*Mentha piperita*) essential oil (NHR Organic Oils) (Example 23).

Examples 24-25

Homogenisation

Example 5 was repeated except that, instead of high-pressure homogenisation at 25,000 psi, the formulation was shear mixed at 24,000 rpm (Example 24) or high pressure homogenised at 10,000 psi (Example 25).

Example 26

Formulations from Example 4, Example 5 and a 0.1% solution of citrussy hop oil in propylene glycol, as a Reference Example of the industry standard formulation, were dosed into a neutral all-malt lager beer at 280 ppm. The beer was assessed by a four-member taste panel. The results are given in Table 3 below.

Example 27

Varying concentrations of oil and hop acid Orange essential oil (*Citrus sinensis*) Miaroma was mixed with the KBR of Example 1 in ratios of 5:1, 2:1, 1:1, 1:2 and 1:5. These mixtures were vigorously stirred with water to give 1% and 0.1% oil formulations.

Examples 28-31

Syrup Formulations

Lemon (*Citrus limon*) essential oil (NHR Organic Oils) (0.2 g) and the KBA of Example 2 (0.13 g) was mixed and added to vigorously stirred water (200 g) to give a lemon formulation.

The lemon formulation (30 g) was thoroughly stirred with sugar (Tate and Lyle) (150 g) and water (120 g) to form a lemon sugar syrup (Example 28) containing 50% sugar and 100 ppm oil. The lemon formulation (150 g) was also thoroughly stirred with sugar (Tate and Lyle) (150 g) to form a lemon sugar syrup (Example 29) containing 50% sugar and 500 ppm oil.

This methodology was repeated but without any addition of KBA to give lemon sugar syrups containing 50% sugar and 100 ppm oil (Example 30) and 50% sugar and 500 ppm oil (Example 31).

Example 32

Carbonated and Non-Carbonated Lemon Flavoured Drinks

The lemon sugar syrup formulation of Example 28 (50 g) was added to still and sparkling spring water (450 g) to give lemon-flavoured drinks containing 5% sugar and 10 ppm oil. This was repeated with lemon sugar syrup (Example 30) to give lemon-flavoured drinks containing 5% sugar and 50 ppm oil.

The lemon sugar syrup of Example 29 (50 g) was added to still and sparkling spring water (450 g) to give lemon-flavoured drinks containing 5% sugar and 50 ppm oil. This was repeated with the lemon sugar syrup formulation of Example 31 to give lemon-flavoured drinks containing 5% sugar and 50 ppm oil.

Example 33

Formation of Sodium Salt of Hop Beta Acids (NaBA)

A dilute aqueous solution of a potassium salt of hop beta resin (Barth-Haas Group, BetaStab® 10 A) was acidified with 40% sulphuric acid (200 g) at 70° C. The resultant resin layer was purified by recrystallization to give hop beta acid crystals (138 g, 85.87%). Hop beta acid crystals (10 g) were warmed to 80° C. and 40% w/w sodium hydroxide (2.4 g) added dropwise until pH 10.1. A brown semi-solid resin was formed (containing 84.56% hop beta acids).

Examples 34-37

Citrussy hop oil (0.2 g) was mixed with either KBA from Example 2, NaBA from Example 33 or hop beta acid crystals. Each mixture was vigorously stirred with water (200 g) to give formulations containing 0.1% oil and 0.05% hop beta acids. Additionally citrussy hop oil (0.2 g) was vigorously stirred with water (200 g) without any hop beta acid addition.

Example 38

Formation of Potassium Salt of Tetrahydro-Iso-Alpha Acids

Tetra resin (20 g, 75.2% tetrahydro-iso-alpha acids) (Barth Haas Group) was stirred at 70° C. and 45% w/w potassium hydroxide (5.2 g) added dropwise. The mixture was heated at 80° C. for a further 1 h to give a brown semi-solid (containing 69.9% tetrahydro-iso-alpha acids).

Example 39

Formation of Oil Formulations

The potassium salt of tetrahydro-iso-alpha acids of Example 38 (0.3 g, 69.9% tetrahydro-iso-alpha acids) and citrussy hop oil (0.2 g) was added to deionised water (200 g) and mixed with a high shear mixer (UltraTurrax) at 9,200 rpm for 10 minutes. The resultant emulsion was passed five times through a high-pressure homogeniser (Avestin Emulsiflex-C3) at 25,000 psi. After 134 days at room temperature, the emulsion showed excellent stability.

Results

Assessment of Haze

A dosed beer sample from Example 12 was degassed overnight at 5° C. and the haze measured using a haze meter (Hach 2100N Turbidimeter) and compared against beers dosed with essential oils dissolved propylene glycol (the current industry standard) for comparison. The results are shown in Table 1.

TABLE 1

| | | | | Haze at |
| | | Hop oil | Hop beta acid | 5° C. |
| | Hop oil in | added to | added to | (EBC |
| Formulation | formulation | beer | beer | units) |
| --- | --- | --- | --- | --- |
| Control | None | 0 ppm | 0 | 0.38 |
| Propylene glycol | Citrussy fraction | 400 ppb | 0 | 0.43 |
| Propylene glycol | Spicy fraction | 400 ppb | 0 | 0.43 |
| Example 4 | Citrussy fraction | 400 ppb | 200 ppb | 0.45 |
| Example 7 | Spicy fraction | 400 ppb | 200 ppb | 0.41 |
| Example 5 | Citrussy fraction | 400 ppb | 800 ppb | 0.96 |
| Example 8 | Spicy fraction | 400 ppb | 800 ppb | 0.75 |

These results show that the formulation from Examples 4 and 7 (as with a propylene glycol formulation), do not increase the haze of the beer significantly from the control, so the hop oil formulation can be added in the final bright beer (or potentially anywhere in the brewing process) without negative effects. Formulations from Examples 5 and 8 do cause some haze so would need to be added prior to a final beer filter to ensure a clear final beer.

Sensory Evaluation

The dosed beer samples from Example 12 were tested empirically with a five-member tasting panel. The results are given in Table 2.

TABLE 2

| | | | | Sensory evaluation - Increased hop aroma and flavour |
| | | Hop oil | Hop beta acid | cf. control |
| | Hop oil in | added to | added to | (% tasters |
| Formulation | formulation | beer | beer | agree) |
| --- | --- | --- | --- | --- |
| Control | None | 0 ppm | 0 | No |
| Propylene glycol | Citrussy fraction | 400 ppb | 0 | Yes (100%) |
| Propylene glycol | Spicy fraction | 400 ppb | 0 | Yes (100%) |
| Example 4 | Citrussy fraction | 400 ppb | 200 ppb | Yes (100%) |
| Example 7 | Spicy fraction | 400 ppb | 200 ppb | Yes (100%) |
| Example 5 | Citrussy fraction | 400 ppb | 800 ppb | Yes (100%) |
| Example 8 | Spicy fraction | 400 ppb | 800 ppb | Yes (100%) |

The results demonstrate that by adding only 400 ppb of hop oil to the beer a stronger hop aroma/flavour was observed by all participants in all samples compared with the control.

The dosed beer samples from Example 26 were tested empirically with a four-member tasting panel and the total hop aroma intensity assessed on a scale of 1 (low) to 10 (high). The results are given in Table 3.

TABLE 3

| Formulation | Hop oil added to beer | Hop Aroma Intensity |
| --- | --- | --- |
| Control | 0 ppb | 3 |
| Example 4 | 280 ppb | 6 |
| Example 5 | 280 ppb | 5 |
| Reference Example - 0.1% citrussy oil in propylene glycol | 280 ppb | 5 |

The results demonstrate that by adding only 280 ppb of hop oil to the beer a stronger hop aroma/flavour was observed by all participants in all samples compared with the control. Beers dosed with formulation using KBA (example 4) showed the greatest hop aroma intensity.

This confirms that the inventive formulations satisfactorily release the hop oil into the beer.

ASSESSMENT OF FORMULATION STABILITY

FIG. 1 shows the stability of aqueous whole oil formulations (based on the preparations in Examples 13 to 16) after 35, 105 and 360 days.

FIG. 2 shows the stability results of the aqueous solutions of fractionated oil formulations (based on Examples 3, 6 and 9 with 0.1% KBA and Examples 4, 7 and 10 with 0.05% KBA) after 48, 99 and 239 days.

FIG. 3 shows the stability results of the aqueous solutions of fractionated oil formulations (based on Examples 5, 8 and 11 with 0.2% KBR) after 35, 105 and 360 days.

FIG. 4 shows the stability results of aqueous formulations under different mixing. The term 'shear mixed' denote formulations which were shear mixed at 24,000 rpm, but not high pressure homogenised. '10×10K psi' denotes formulations homogenised by 10 passes at 10,000 psi (69 MPa). '10×25K psi' denotes formulations homogenised by 10 passes at 25,000 psi (172 MPa).

The stability was assessed by the following scale: 5—No visible separation, 4—very slight separation, 3—slight separation, 2—some separation, 1—significant separation.

FIG. 1 demonstrates the stability of the whole oil formulations after 35, 105 and 360 days. Very good stability is seen.

FIGS. 2 and 3 demonstrate that the fractionated oil formulations with both KBR and KBA, have even better stability. FIG. 4 shows the benefit of high-pressure homogenization. Shear mixed samples did show some separation of the hop oil but can be rapidly re-mixed simply by shaking.

Table 4 below shows the stability of formulations made using Example 20 of varying oil concentration (note: samples were not high pressure homogenised).

TABLE 4

| Oil concentration | Potassium hop beta acid concentration | Stability | |
|---|---|---|---|
| | | 3 days | 70 days |
| 10% w/w | 10% w/w | 1 | 1 |
| 1% w/w | 1% w/w | 4 | 3 |
| 0.5% w/w | 0.5% w/w | 5 | 4 |
| 0.1% w/w | 0.1% w/w | 5 | 4 |
| 0.05% w/w | 0.05% w/w | 5 | 5 |
| 0.01% w/w | 0.01% w/w | 5 | 5 |

Table 5 below shows the stability of formulations made using Examples 21 to 23 of varying oil types and concentration (note: samples were not high pressure homogenised).

TABLE 5

| | | Stability of oil formulation after 74 days | | |
|---|---|---|---|---|
| Oil concentration | Potassium hop beta acid concentration | Hydro-distilled Target hop oil Example 21 | Lemon oil Example 22 | Peppermint oil Example 23 |
| 5% w/w | 5% w/w | 1 | 1 | 1 |
| 2% w/w | 2% w/w | 2 | 2 | 1 |
| 1% w/w | 1% w/w | 3 | 3 | 2 |
| 0.5% w/w | 0.5% w/w | 4 | 3 | 2 |
| 0.1% w/w | 0.1% w/w | 4 | 4 | 3 |
| 0.05% w/w | 0.05% w/w | 4 | 4 | 4 |
| 0.01% w/w | 0.01% w/w | 5 | 4 | 4 |

Density of Potassium Hop Resin and Essential Oils

The density of the essential oils and the hop acid salts was assessed, and the results are shown in Table 6 below.

TABLE 6

| Component | Density - g/ml at 25° C. |
|---|---|
| HD Target hop oil | 0.92 |
| MD Target hop oil | 0.91 |
| SD Target hop oil | 0.86 |
| Spicy fraction | 1.17 |
| Citrussy fraction | 0.98 |
| Floral fraction | 0.92 |
| Late hop floral fraction | 0.93 |
| Orange oil | 0.85 |
| Potassium beta acid resin | 1.09 |
| Potassium iso-alpha acid resin | 1.15 |

Table 7 below shows the stability of formulations made using Examples 27 with varying ratios of oil and KBR (note: samples were not high pressure homogenised).

TABLE 7

| Ratio of oil to KBR | Calculated density of mixture | Stability of formulation | | | |
|---|---|---|---|---|---|
| | | 5 days | | 37 days | |
| | | 1% oil | 0.1% oil | 1% oil | 0.1% oil |
| 5:1 | 0.90 | 1 | 1 | 1 | 1 |
| 2:1 | 0.94 | 1 | 1 | 1 | 1 |
| 1:1 | 0.97 | 2 | 4 | 1 | 4 |
| 1:2 | 1.01 | 3 | 5 | 3 | 4 |
| 1:5 | 1.05 | 4 | 4 | 2 | 4 |

It was observed that the optimum formulations arise when the combined density of the hop acid and oil are similar to the density of the water so that the oil remains in suspension and does not tend to rise or cream to the top or sediment on the bottom. This suggests that the hop acids may be acting as weighting agents, as well as or rather than emulsifiers.

Other Hop Acids

The use of other hop acid salts was assessed, and the results shown in Table 8.

TABLE 8

| Formulation | Hop Acid (potassium salt) | Stability | |
|---|---|---|---|
| | | 19 days | 210 days |
| Example 17 | Alpha acid | 4 | 2 |
| Example 18 | Iso-alpha acid | 3 | 1 |
| Example 19 | Beta acid | 4 | 3 |

It was observed that all hop acids improve the stability of the formulations although hop beta acids show optimum effectiveness.

Flavoured Drinks

Table 9 shows that aqueous hop beta acid and essential oil formulations containing sugar show good stability.

TABLE 9

| | Lemon Syrup | | | |
|---|---|---|---|---|
| Formulation | Sugar concentration | Oil concentration | Hop beta acid concentration | Stability 14 days |
| Example 28 | 50% | 100 ppm | 50 ppm | 4 |
| Example 29 | 50% | 500 ppm | 250 ppm | 5 |
| Example 30 | 50% | 100 ppm | 0 ppm | 1 |
| Example 31 | 50% | 500 ppm | 0 ppm | 2 |

When these syrups were added to still or sparkling water, sweet, lemon-flavoured drinks were produced (Example 32).

Hop Beta Acids in Salts and Free Acid Form.

The use of hop beta acids as different salts (sodium and potassium) and in their free acid form was assessed and the results shown in Table 10.

TABLE 10

| Formulation | Hop beta Acid used | Stability 3 days |
|---|---|---|
| Example 34 | KBA | 4 |
| Example 35 | NaBA | 4 |
| Example 36 | Hop beta acid crystals | 2 |
| Example 37 | None | 1 |

It was observed that best stability was formulations with hop beta acids in their salt form, rather than their free acid form. As expected, if no hop beta acids were added to the formulation, the oil rapidly separated from the water.

DISCUSSION

From our work, we have determined that hop acids (optimally in their salt form) can stabilise hop oils and other essential oils in aqueous formulations. The formulations disperse well and have excellent stability.

The formulations are made by mixing the hop or other essential oil and potassium hop beta acid resin and then mixing vigorously into water. Stability can be enhanced by high-pressure homogenisation of the aqueous formulation. The formulations are typically cloudy in appearance. Optimum formulations show good stability at least up to six months. Even at high oil concentrations of 5 wt %, if separation does occur, a brief shake by hand readily restores a uniform emulsion.

The hop acids may be acting solely as emulsifiers (ie., they have a polar portion to solubilise in water and lipophilic portion to solubilise oil). However, when added to water, the potassium hop beta acids would be expected to form mainly the free acid and hence be water-insoluble (pKa-ca. 5.5-7.8) under the acidic or neutral pH conditions of certain essential oil preparations. Accordingly, we hypothesise that the hop beta acids potentially may alternatively or additionally be acting as weighting agents. Hop oils typically have density of 0.8-0.9 g/ml and potassium hop beta acids have density of ca. 1.1 g/ml. By mixing the acids with oil, the resultant droplets could be expected to have similar densities to water, thereby being less prone to creaming.

Hop acids found to be suitable in this work include hop beta acids (lupulones), hop alpha acids (humulones), iso-alpha acids (iso-humulones), rho-iso-alpha acids (rho-iso-humulones), tetrahydro-iso-alpha acids (tetrahydro-iso-humulones), hexahydro-iso-alpha acids (hexahydro-iso-humulones), hexahydro-beta acids (hexahydro-lupulones), hulupones, humulinones, including co, n, ad homologues, isomers (e.g. cis/trans), stereoisomers (R and S) and mixtures thereof. Preferred formulations use beta acids, but other hop acids such as alpha acids, iso-alpha acids and tetrahydroiso-alpha acids also show good properties.

From our work, it appears that any essential oil is suitable for formulation in accordance with the present invention. The invention is particularly useful for food and drink applications using essential oils such as: hop, orange, lemon, lavender, oregano. The essential oils may be whole hop oils (e.g. steam distilled (SD), molecular distilled (MD), hydro-distilled (HD)) or fractionated hop oils (e.g. spicy, citrussy, floral, late hop floral fractions), as required, having regard to the intended purpose of the essential oil. For example, the formulations can be used to dose hop oil formulations in the brewing process—ideally at end of the process—to the final bright beer or to dose citrus essential oils into fruit-based drinks.

Accordingly, the present invention also provides methods of flavouring beverages by mixing an inventive composition with a beverage; and beverages obtainable by this method. The compositions of the present invention are useful in flavouring low alcohol beverages, such as beers having an alcohol content of 1.2% ABV or lower; 1.0% ABV or lower; 0.5% ABV or lower; 0.1% ABV or lower; or 0.05% ABV or lower.

Additional components, such as thickening agents, e.g. Xanthan gum can be added.

In the context of brewing beer, since hop alpha acids and hop beta acids are already commonly present in beer, by applying the methods and compositions of the present invention, it is not necessary to use ethanol or propylene glycol, or other synthetic emulsifiers. Hitherto, there have been very few natural emulsifiers available for food use, hence this application has a broad scope not only in beer, but for many other food and drink formulations.

Additionally, hop acids have antimicrobial activity, so will tend to protect the aqueous formulations from micro-contamination. No bacterial, yeast or mould growth was seen in any unopened samples, even after extended periods of storage, such as twelve months or more. This demonstrates that products prepared with compositions of the present invention have good shelf-life.

Taste testing trials have shown that, when formulations are added to beer, the flavour or aroma of the hop oil are released into the beer. Hop beta acids themselves have very little taste impact and so will not give any negative effect on aroma or flavour of the final beer in the amounts resulting from use of the compositions of the present invention. Other hop acids are bitter, but the amount added by the formulations of the present invention are sufficiently low that the amount of hop acid will not significantly affect taste of final product. For example, iso-alpha acids have a taste threshold in beer of a few ppm whereas the taste threshold for hop essential oils is typically in terms of parts per billion. Typically, beer contains 10-100 ppm iso-hop alpha acid for bitterness. Accordingly, in the context of the preferred formulations in which the ratio of hop oil to hop acid salt is in the range of 1:2 to 2:1, the addition of 400 ppb of hop oil to a beer will only add an additional 200-800 ppb of iso-hop alpha acids and will therefore have a negligible or no impact on the taste of the beer.

Additionally, the emulsification properties of hop acids can not only be exploited for essential oils, but may be used to stabilise other oil/water-based mixtures. For instance, with food and beverages, the hop acids can be used to emulsify any oil soluble components such as flavours, colours, antioxidants and vitamins. Similarly, in cosmetic and personal care products, the hop acids can be used to emulsify water insoluble components such as flavours, colours, aromas and active ingredients. Additionally, the hop acids may be used to emulsify certain water-insoluble active ingredients in pharmaceutical compositions.

The invention claimed is:

1. An aqueous emulsifiable composition comprising:
about 0.01-5.00 wt % of at least one essential oil, and
about 0.005-10.0 wt % of at least one hop acid, and
water as a solvent, wherein the water is the only solvent, wherein the aqueous emulsifiable composition has a hop acid content and a total essential oil content in a ratio of 1:5 to 5:1, and the balance being water.

2. The aqueous emulsifiable composition as claimed in claim 1 wherein the at least one hop acid is at least one hop beta acid, hop alpha acid, iso-alpha acid, rho-iso-alpha acid, tetrahydro-iso-alpha acid, hexahydro-iso-alpha acid, hexahydro-iso-beta acid, hulupone or humulinone or a mixture or mixtures thereof.

3. The aqueous emulsifiable as claimed in claim 1, wherein the at least one hop acid is at least one hop acid salt.

4. The aqueous emulsifiable composition as claimed in claim 1, wherein the at least one hop acid is at least one isolated or purified hop acid or the at least one hop acid is at least one hop acid salt, which is at least one isolated or purified hop acid salt.

5. The aqueous emulsifiable composition as claimed in claim 1, wherein the at least one essential oil is at least one hop essential oil, or at least one fruit essential oil, at least one flower essential oil, at least one seed essential oil, or mixture or mixtures thereof.

6. The aqueous emulsifiable composition as claimed in claim 1, wherein the aqueous emulsifiable composition is formed by mixing the at least one hop acid and the at least one essential oil; and combining the mixture with water.

7. The aqueous emulsifiable composition as claimed in claim 1, wherein the aqueous emulsifiable composition has an essential oil content of up to about 2 wt %.

8. The aqueous emulsifiable composition as claimed in claim 1, wherein the aqueous emulsifiable composition has a hop acid content of about 0.01 wt % or more.

9. The aqueous emulsifiable composition as claimed in claim 1, wherein the composition has a hop acid content of up to about 5 wt %.

10. A method of stabilising or emulsifying an essential oil or mixture of essential oils, the method comprising the steps of:
mixing the essential oil or mixture of essential oils with at least one hop acid to form an essential oil and hop acid mixture; and
mixing the essential oil and hop acid mixture with water to prepare an aqueous emulsifiable composition as defined in claim 1.

11. A method as claimed in claim 10, wherein the hop acid is hop beta acid, hop alpha acid, iso-alpha acid, rho-iso-alpha acid, tetrahydro-iso-alpha acid, hexahydro-iso-alpha acid, hexahydro-beta acid, hulupone, humulinone or a mixture thereof.

12. A method as claimed in claim 10, wherein the hop acid salt is a monovalent salt.

13. A method as claimed in claim 10, wherein the hop acid or hop acid salt is an isolated hop acid or hop acid salt.

14. A method as claimed in claim 10, wherein the at least one essential oil is at least one hop essential oil, or at least one fruit essential oil, at least one flower essential oil, at least one seed essential oil, or mixture or mixtures thereof.

15. A method as claimed in claim 10, wherein the hop acid and essential oils are mixed in a ratio of about 1:5 to about 5:1.

16. A method as claimed in claim 10, wherein the essential oil or mixture of essential oils, the hop acid or mixture of hop acids and water are mixed to provide an essential oil content of up to about 5 wt %.

17. A method as claimed in claim 10, wherein the essential oil or mixture of essential oils, the hop acid or mixture of hop acids and water are mixed to provide a hop acid content of about 0.01 wt % or more.

18. A method as claimed in claim 10, further comprising the step of shear mixing the mixture or high-pressure homogenisation of the mixture.

19. A method of flavouring a beverage, the method comprising mixing a composition as claimed in claim 1 with a beverage.

20. The aqueous emulsifiable composition as claimed in claim 9, wherein the composition has a hop acid content of up to about 2 wt %.

21. The aqueous emulsifiable composition as claimed in claim 1, which does not include ethanol, propylene glycol or a synthetic emulsifier.

22. An aqueous emulsifiable composition consisting essentially of:
about 0.01-5.00 wt % of at least one essential oil, and
about 0.005-10.0 wt % of at least one hop acid, and
water,
wherein the aqueous emulsifiable composition has a hop acid content and a total essential oil content in a ratio of 1:5 to 5:1, and the balance being water.

* * * * *